No. 819,210. PATENTED MAY 1, 1906.
G. P. DOERN.
WANTAGE ROD.
APPLICATION FILED DEC. 7, 1904.
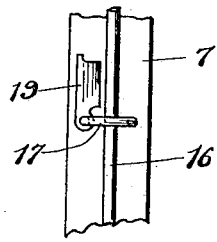
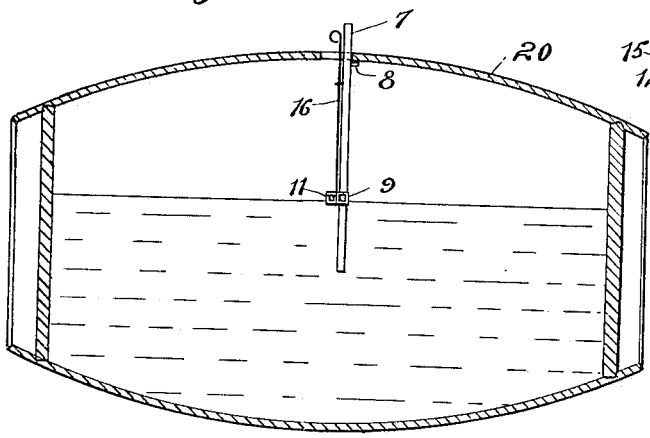
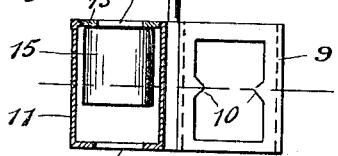
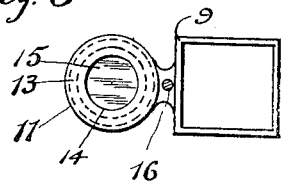
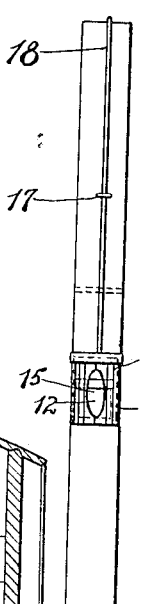
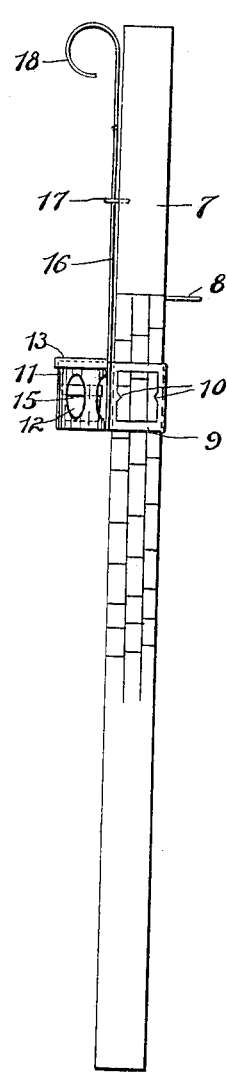
Witnesses:
B. C. Bean.
M. C. Siktberg.
Inventor,
George P. Doern,
By Glenn S. Noble
Att'y.

UNITED STATES PATENT OFFICE.

GEORGE P. DOERN, OF CHICAGO, ILLINOIS.

WANTAGE-ROD.

No. 819,210.  Specification of Letters Patent.  Patented May 1, 1906.

Application filed December 7, 1904. Serial No. 235,905.

*To all whom it may concern:*

Be it known that I, GEORGE P. DOERN, a citizen of the United States, residing at Chicago, in the county of Cook and State of Illinois, have invented certain new and useful Improvements in Wantage-Rods, of which the following is a specification.

This invention relates more particularly to wantage or ullage rods for determining the wantage of casks, barrels, or the like, and comprises more particularly means to be used in connection with such rods for accurately determining the level of the liquid in the barrels or casks and marking or indicating the level on the rod, so that it may be removed for reading.

It consists in the combination with a gage-rod of the character indicated, of a slidable indicating device which may be adjusted to indicate the level of the liquid and will remain in adjusted position, so that the rod, with the indicating device, may be removed from the barrel and the wantage read directly from the rod.

Heretofore it has been necessary for the gager to insert the wantage-rod into the barrel or cask and to determine the level of the liquid after withdrawing the rod by the line between the wet and dry portions of the rod. Obviously this line is frequently indistinct and variable and does not form an accurate means of determining the exact level of the liquid. This objection is overcome by means of the present invention, which is fully illustrated in the accompanying drawings, in which—

Figure 1 is a side elevation of a wantage-rod provided with my improved reading device. Fig. 2 is a front view of the same. Fig. 3 is a detail showing a locking-wedge for the wire for adjusting the reading device. Fig. 4 is a diagrammatical view of the wantage-rod shown in position for gaging in a barrel. Fig. 5 is a detail, partly in section, of the reading device; and Fig. 6 is a top plan view of the device shown in Fig. 5.

The wantage-rod 7 may be of any ordinary or preferred form with suitable scales or marks thereon for gaging purposes. This rod is provided with a stop or shoulder 8, which is adapted to engage with the inner side of the barel or cask after the rod has been inserted through the bung-hole, as shown in Fig. 4. The reading device proper comprises a slidable sleeve or the like 9, which is adapted to engage with the rod 7 and slide thereon, and is provided with points or indicators 10, which represent the level of the fluid when the reading device has been adjusted on the rod. Secured to or formed with the reading portion 9 is a cylindrical receptacle 11, which is perforated at the bottom and side, as indicated at 12, and is provided with a cap or cover 13, provided with an opening 14 therein.

A float 15 is inserted in the cylinder 11 and is adapted to move freely up and down therein. This float may be made of any suitable material, such as cork or the like; but I prefer to make it in the form of a closed cylinder or cup from aluminium or other suitable metal. The float and its receiving-cylinder, and the reading portion are so proportioned that when the device has been lowered into the liquid and the float rises until it engages with the cap 13 the level of the liquid will coincide with the indicator-points 10.

A wire 16 is secured to the reading device and passes up along the side of the rod 7 and is preferably supported or held in position by means of one or more staples or keepers 17. This wire terminates in a ring or hook 18 for the finger of the operator. In order to lock the reading device in adjusted position, any ordinary form of catch may be used to engage with the wire 16, and in Fig. 3 I have shown a type of locking device, which consists in a wedge-shaped catch 19, pivoted to one of the sides of the staple 17 and adapted to be forced in between the wire 16 and the rod 7 to lock said wire, and thereby hold the reading device.

The operation of this invention will be readily understood from Figs. 4 and 5. The rod, with the reading device thereon, is inserted into a barrel or cask 20 and the catch or stop 8 brought up under the inner side at the edge of the bung-hole. The reading device is then pushed down by means of the wire 16 until the operator observes the float 15 begin to rise in the cylinder 11. The reading device is then carefully lowered until the float reaches the cap 13, when the points 10 are at the level of the liquid. The operator then withdraws the rod and reading device and reads the wantage as indicated thereon. If desired, the wire 16 may of course be locked by means of the wedge 19, as above indicated. It will be observed that the variation of the reading-point on the device 9 for various liquids is found to be practically a negligible quantity; but the reading device may be adjusted for any liquid and the points or reading-line indicated accordingly. The top of the float 15 may be coated with a luminous paint or substance, so that its movement may be more readily observed; but this will not be necessary in most cases.

I am not aware that heretofore any wantage-reading devices or liquid-level-indicating devices have been patented or used, and it is my intention in this application to claim the same broadly. Therefore I do not wish to limit myself to the exact details of construction herein set forth; but

What I claim, and desire to secure by Letters Patent, is—

1. The combination with a wantage or ullage rod, of a slidable reading device for indicating the level of the liquid at the surface of such liquid, and means whereby the operator may determine when the reading device is in proper position for indicating the level of the liquid.

2. The combination with a wantage-rod, of a slidable liquid-level-indicating device for indicating such level at the surface of the liquid, means for sliding said device, and means whereby the operator may determine when said device is in position for indicating the level of the liquid.

3. The combination with a wantage-rod, of a slidable liquid-level-indicating device, means for sliding said device, a receptacle in connection with said indicating device, and a float in said receptacle for indicating the distance to which said device should be inserted in the liquid for the indicating-points to correspond with the level of the liquid.

4. The combination with a gage-rod and a manually-slidable gage-reading device, of a float for indicating when said device is in proper position to register the level of the liquid.

5. The combination with a wantage-rod, of a stop on said rod for engaging with the barrel, a sleeve on said rod provided with indicating-points, a wire for moving said sleeve, means for locking said wire when the sleeve is in adjusted position, an open cylinder connected with said sleeve, and a float in said cylinder.

6. The combination with a gage-rod, of a manually-slidable gage-reading device provided with a cylinder having openings in the top and bottom thereof and a float in said cylinder for indicating when said reading device is in proper position to register the level of the liquid.

GEORGE P. DOERN.

Witnesses:
B. C. BEAN,
M. C. SIKTBERG.